2,784,070

COLOR FORMATION ON APPLES

Eric C. Cameron and Verle W. Woods, Yakima, Wash., assignors to Woods Industries Inc., Yakima, Wash., a corporation of Washington No Drawing. Application March 19, 1954, Serial No. 417,494

3 Claims. (Cl. 71—2.3)

This invention relates to a process and product for use in production of apples to improve the coloration of the fruit. It is a well known fact that the grading of apples according to standard procedure is basically in the fancy and extra fancy grades, a matter of selection according to color, shape and size. If two apples are of equal uniformity in size and shape but one has the desirable characteristic coloring more fully developed, it may be graded higher and command a higher price than the other apple which has the coloring only partially developed. The coloring of apples is due to the formation with the aid of the sun's rays of a certain chemical known as anthocyanins in the apple skin. The coloring matter develops most fully where the apples are exposed to the full effect of the sun's rays. The shaded or partially shaded apple surfaces are not so fully colored. Moreover, the coloration may be seriously retarded by lack of sunshine at the proper period in the growth of the apples.

It is the purpose of the present invention to provide a method and material whereby the apple is given an increased capacity to develop coloring matter in its skin so that even those portions of the apple which are partially shaded may be caused to develop coloring uniformly and much more rapidly than it is possible merely through the normal process of ripening.

In accordance with our invention we prepare a material in solution which is essentially colorless in itself but which, when applied in a certain way, acts to spread or aid the coloration processes effected in the apple so that much less exposure to direct sun light is necessary to bring out the desired coloration and the time for developing the desired coloration of the apple is materially shortened.

In order that the nature and advantages of our invention will be more fully understood, the following description of a specific process of producing and applying the solution will be given.

In order to prepare the active materials which are utilized to produce the solution that is used, we first collect vapors and gases which are given off by apples placed in storage by passing them through a bed of adsorbent material of an inert nature such as a bed of activated carbon granules. The adsorption process is carried on until the bed of granules is pretty well saturated. The normal storage temperatures used for apples are in the range of 28 degrees F. to 33 degrees F. Our collection can be made satisfactorily at these temperatures. The granules may then be stored, if desired, in a closed container at ordinary atmospheric temperatures for months without losing the adsorbed product which has been recovered. The activated carbon granules, either immediately after collection or after storage, are subjected to steam distillation by placing the granules in a closed container and passing steam through the bed of granules at low temperature and then gradually increasing the temperature of the steam by super heating until complete extraction of the material adsorbed by the granules is obtained. Temperatures above 750 degrees C. have been used to insure complete extraction so that the activated carbon may be used over again.

The water vapors and gases which are evolved from the bed of activated carbon granules are condensed and after condensation, it is found that a light fraction of non-water soluble liquid will rise to the surface of the water. These non-water soluble fractions are decanted off and kept in closed containers. We have found that the condensate recovered from the carbon granules, and particularly the non-water soluble fraction, when used in a diluted form will enhance the apple color. It does, however, contain some ingredients which can produce injury to the fruits.

We have discovered that we can, by distillation separation, remove substantially the ingredients that are responsible for the injury. This is accomplished by discarding those fractions which boil below about 75 degrees C. and those fractions which boil above about 175 degrees C. and by using only the fractions that boil off at temperatures above 75 degrees C. and below 175 degrees C.

This liquid is placed in solution with some nonphytotoxic solvent such as alcohol for use. Denatured ethyl alcohol is suitable.

Alternatively we may add to the fractions a suitable emulsifying agent so that it may be made into an emulsion form in water. The tritons produced by Rohm & Haas have been used successfully as emulsifying agents. The amount of emulsifier used is not critical. We have found one to three percent by volume to be adequate. With either solution, that is, the alcohol, or the water emulsion, we find that the quantity of active ingredient in the final solution should be of the order of ½ percent to 4 percent of the distilled active ingredient by volume, to 99½ percent to 96 percent of solvent. Concentration of 5 percent or more of the active ingredient in the solvent may result in tree foliage injury.

We find that this solution should be spread on the foliage and apples on the tree. When properly applied, it takes about three days for significant color change to be noted. The maximum gain in coloration over normal coloration results in about five days from application.

The tests we have carried out definitely establish that effective color improvement occurs best when treatment is given to the apples and the adjacent leaves while they are on the tree. Treatment of the fruit by wetting it with the solution after picking and exposing it to natural light conditions did not produce any visible increase in color production. Also the same wetting of picked fruit with artifical lighting did not produce any visible increase in color production.

In one example in a local orchard, certain fruit carrying branches of an apple tree were treated with the active non-water soluble material in solution in denatured ethyl alcohol, the proportions being about one part active material in one hundred parts alcohol. The method of treatment was to spray the branches thoroughly until the fruits and adjacent foliage were wet with the solution. The apples on the tree were substantially full grown at the time of treatment but had only light coloration where they were best exposed to sun light.

Daily observation of the tree disclosed little difference between the coloration of apples on treated and untreated branches until the third day after treatment. The difference in coloration between apples on treated and untreated branches became more evident until the fifth and sixth days after treatment. At that time there was a very marked difference in color between the treated and untreated fruits. The treated fruits had more of their surfaces fully colored. The most marked difference, however, was on the shaded surfaces of the fruits. Those treated showed the characteristic color of the variety clearly on the shaded surfaces, while the untreated ones had little or no showing of the characteristic color on their shaded surfaces.

Other tests like the one just described were made with various concentrations of the active material, from ½ percent to more than 5 percent active material. It was found that when the concentration was 5% or more of the active material, there was some injury to the leaves of the tree where they were wet by the solution. No permanent injury to the tree has been noted. The tests were carried out upon different varieties of apples with similar results on all the varieties.

In another example, only a portion of a branch of an apple tree was sprayed so as to wet the fruits and leaves. An unsprayed fruit and leaf carrying portion of the branch was left between the base of the branch and the sprayed portion. Another unsprayed fruit and leaf carrying portion of the branch was left between the tip of the branch and the sprayed portion. The spray solution used in this case was a one percent solution of the active material collected from stored apples of various varieties more than six months before the test was carried out. The concentrated active material was kept in storage until just before the spraying was done and then mixed with the alcohol solvent.

In this experiment, the increased coloration of the sprayed apples, when compared to those on the unsprayed portions of the tree, was evident by the third day and more pronounced by the fifth day after spraying. There was, however, no noticeable increased coloring of the apples on either unsprayed portion of the branch.

In another experiment, the selectively distilled active material comprising the 75 degrees C. to 175 degrees C. boiling point fraction of the decanted non-water soluble portion of the condensate obtained by steam distillation from the carbon granules was mixed with an emulsifying agent sold as Triton X-100 by Rohm & Haas of Washington Square, Philadelphia, Pennsylvania, in proportions of one part emulsifier to one part active material, and then mixed with water to form a one percent solution. This solution was used to spray and thoroughly wet the apples and adjacent leaves on part of the branches of an apple tree about ten days before the apples were expected to be ready for picking. In five days time the sprayed apples had developed full coloring and were more uniformly colored over their entire surface than the other unsprayed apples on the same tree. The unsprayed apples did not at any time develop as much coloring or as even distribution of coloring over their surfaces as the sprayed apples. In this case the collected material was also from several varieties of apples.

In one experiment a plurality of winesap apple trees were treated in part by spraying with solutions varying from ½% active material to 1½% active material from four to six weeks before normal harvest time. The fruits on the treated portions of the trees showed a decided increase in color. In the more advanced fruits the stripe widened or filled in the green background to a point of blush, while the fruits that had little or no color at the time of treatment, advanced to an early stripe and pink stage. This change was noted on the third day after treatment and increased up to the fifth day. At harvest time the ground color was more pronounced on the treated portions of the crop than on the untreated. The sprayed fruits were ready to pick five days sooner than the unsprayed fruits on the same tree.

The fruits from the treated portions and the untreated portions of the trees were placed in storage under the same conditions. Examination of the stored fruits showed that the treatment has not adversely affected the keeping qualities of the fruits in storage.

The foregoing examples show that we have been able to improve the coloring of apples by collecting and condensing adsorbable volatile substances that apples give off when stored and applying these substances to the live apples on a tree. The improvement is not obtained when the apple has already been removed from the tree before application of the substances. The experiments indicate that transmission of the ability to increase coloring from one sprayed part of the tree to another unsprayed part was not appreciable. They also show clearly that the sprayed apples develop coloring with less sunlight than is normally required. This is fully demonstrated by the fact that we have been able to produce an intensity of color in the shaded areas of the tree that would not normally be attained by the fruit.

While we have not been able to isolate specifically the particular volatile material given off by apples in storage that causes the sprayed apples to develop more coloring, we have been able to establish that this material can be taken from stored apples without particular regard to the particular variety of the stored apples. It is found in the non-water soluble substances which are given off slowly by apples in storage and collected through adsorption by an inert adsorbent material such as carbon granules and recovered by steam distillation. We also have found that this material has a boiling point between 75 degrees C. and 175 degrees C. The actual process by which this material causes the increased color production on the apples is not known to us. We have, however, collected the material and utilized it according to the methods hereinbefore described on the growing apples to produce color in the fruit in a shorter time and to a higher degree than would normally be the case.

Having thus described our invention, we claim:

1. A method of improving coloration of apples which comprises the steps of collecting and condensing to liquid form, volatile substances given off into the air by apples after they are picked, separating the fraction of the collected substances which has a boiling point between 75 degrees C. and 175 degrees C. and which is non-water soluble, mixing this fraction with a non-phytotoxic liquid to approximately ½ to 4 parts of the fraction to one hundred parts of the non-phytotoxic liquid, and wetting the apples and adjacent foliage growing upon an apple tree with the mixture.

2. A method of improving coloration of apples which comprises the steps of collecting and condensing to liquid form, volatile substances given off into the air by apples after they are picked, separating the fraction of the collected substances which has a boiling point between 75 degrees C. and 175 degrees C. and which is non-water soluble, forming a water emulsion including ½% to 4% of said fraction by volume and wetting the apples and adjacent foliage growing upon an apple tree with said emulsion.

3. A method of improving coloration of apples which comprises the steps of collecting and condensing to liquid form, volatile substances given off into the air by apples after they are picked, separating the fraction of the collected substances which has a boiling point between 75 degrees C. and 175 degrees C. and which is non-water soluble, placing the fraction in solution with ethyl alcohol in proportions of approximately ½% to 4 parts of the fraction to 100 parts alcohol by volume, and wetting growing apples with the solution.

References Cited in the file of this patent

UNITED STATES PATENTS

| | | |
|---|---|---|
| 2,084,461 | Sarber et al. | June 22, 1937 |
| 2,358,882 | Rahrbough | Sept. 26, 1944 |
| 2,519,873 | Berg | Aug. 22, 1950 |

OTHER REFERENCES

Nichols, in "Christian Science Monitor," December 31, 1948, p. 6.

Smock et al.: "Air Purification in Apple Storage," Chemical Abstracts, vol. 43, 1949, 3537(d).

Thompson et al.: "Volatile Products of Apples," Chemical Abstracts, vol. 46, 1952, 3178(c).

Fidler: "The Physiologically-Active Volatile Organic Compounds Produced by Fruits," Chemical Abstracts, vol. 45, 1951, 220(g).